Dec. 12, 1939.    G. K. McKEE ET AL    2,183,297
MACHINE TOOL
Filed Nov. 25, 1936    6 Sheets—Sheet 1

INVENTORS,
GEORGE K. McKEE,
CHARLES E. BERNITT,
BY Ramsey and Rave
ATTORNEYS.

Dec. 12, 1939.         G. K. McKEE ET AL         2,183,297
                        MACHINE TOOL
Filed Nov. 25, 1936              6 Sheets-Sheet 2

INVENTORS.
GEORGE K. McKEE
CHARLES E. BERNITT
BY Ramsey & Rave
ATTORNEYS.

INVENTORS,
GEORGE K. McKEE
CHARLES E. BERNITT
BY Ramsey & Ravo
ATTORNEYS.

Dec. 12, 1939.   G. K. McKEE ET AL   2,183,297
MACHINE TOOL
Filed Nov. 25, 1936    6 Sheets-Sheet 4

INVENTORS
GEORGE K. McKEE
CHARLES E. BERNITT,
BY Ramsey & Rave
ATTORNEYS.

Dec. 12, 1939.　　　G. K. McKEE ET AL　　　2,183,297
MACHINE TOOL
Filed Nov. 25, 1936　　　6 Sheets-Sheet 5
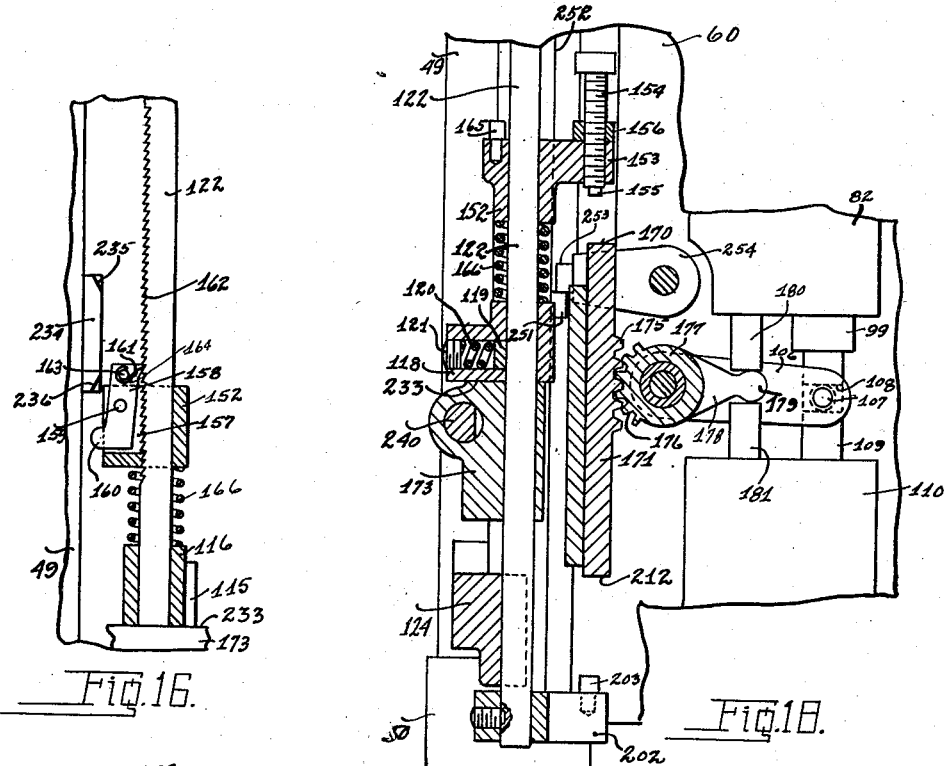
Fig. 16.
Fig. 18.
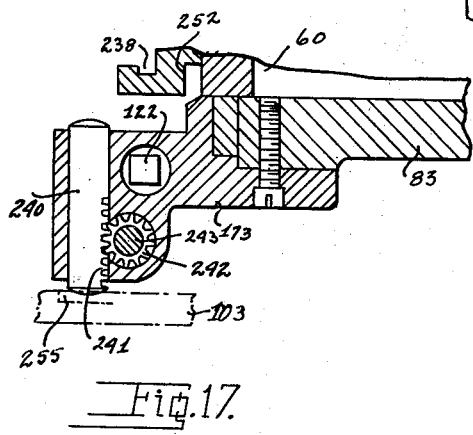
Fig. 17.
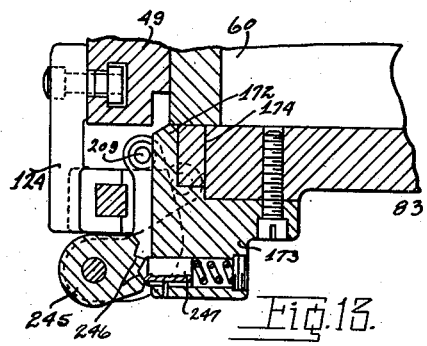
Fig. 15.
INVENTORS
GEORGE K. McKEE
CHARLES E. BERNITT,
BY Ramsey ＆ Rars
ATTORNEYS.

Patented Dec. 12, 1939

2,183,297

UNITED STATES PATENT OFFICE 2,183,297

MACHINE TOOL

George K. McKee, Cincinnati, Ohio, and Charles E. Bernitt, Covington, Ky., assignors to The Avey Drilling Machine Company, Covington, Ky., a corporation of Ohio Application November 25, 1936, Serial No. 112,724

18 Claims. (Cl. 77—32)

This invention relates to improvements in machine tools and particularly to improvements in drilling machines.

In the drilling of long holes in metallic objects, it is frequently necessary and desirable to periodically withdraw the tool from the hole for the purpose of clearing the chips and then continue the drilling for a distance, whereupon, the tool is again withdrawn, and continue this drilling and chip clearing periodically, until the hole is completely drilled or bored. The length of drilling time for each step of the drilling is, of course, variable, depending upon the density or hardness of the material being drilled and the diameter of the hole. Various attempts have been made to accomplish this result, each with varying degrees of success, due to the fact that the means for accomplishing this step drilling process was of the true friction type which frequently failed, in that it failed to securely hold at successive adjustments and was, therefore, a more or less hit and miss proposition. Attempts have also been made to effect this operation by means of step bars and the like, in which each successive drilling operation was identical with no means for adjusting either the depth of the cut or the duration of drilling time, which is necessary, due, as was stated above, to the density or hardness of the material being operated upon or the size of the drill or the hole being drilled.

By the present invention, all of these difficulties have been over-come, and it is therefore one of the principal objects of this invention to provide a step drilling machine, which is positive in its action, yet adjustable within wide limits to take care of these conditions, encountered in actual practice.

It is also an object of this invention to provide an accumulating step means which is positive in construction and operation for definitely operating the control mechanism at the necessary and desired parts.

A further object of this invention, is the provision of a step drilling control mechanism which is automatic in operation, in effecting the cyclic rapid and feed movements of the drill or other tool and insuring the parts returning to and operating at the points desired in each cycle.

A still further object of this invention is the provision of a complete control mechanism which is positive in its operation in snapping the control mechanism from the rapid movement to the feed movement and from the feed movement to the return rapid movement without danger of over-riding the intended points of snap-over.

It is also the object of this invention to provide a mechanism to accomplish the above objects, which is relatively simple in construction and comparatively inexpensive to manufacture.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

Fig. 13 is an enlarged, sectional view through a portion of the drilling head as seen from line 13—13 on Fig. 3.

Fig. 16 is an enlarged, fragmentary, vertical, sectional view partly in elevation and partly in section, as seen from line 16—16 on Fig. 3.

Fig. 17 is an enlarged, fragmentary, horizontal, section view taken on line 17—17 of Fig. 3.

Fig. 18 is an enlarged, sectional view through the valve operating means as seen from line 18—18 on Fig. 6.

Throughout the several views of the drawings similar reference characters are employed to denote the same or similar parts.

Figure 2:
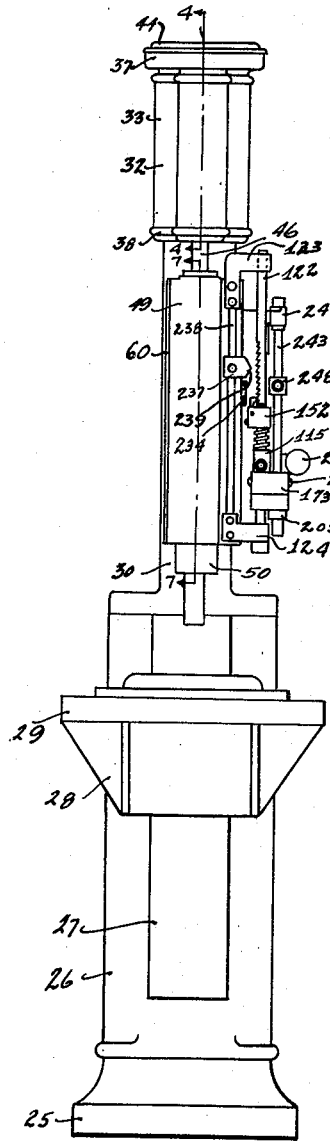
Fig. 2 is a front elevation of the machine illustrated in Fig. 1.
Figure 1:
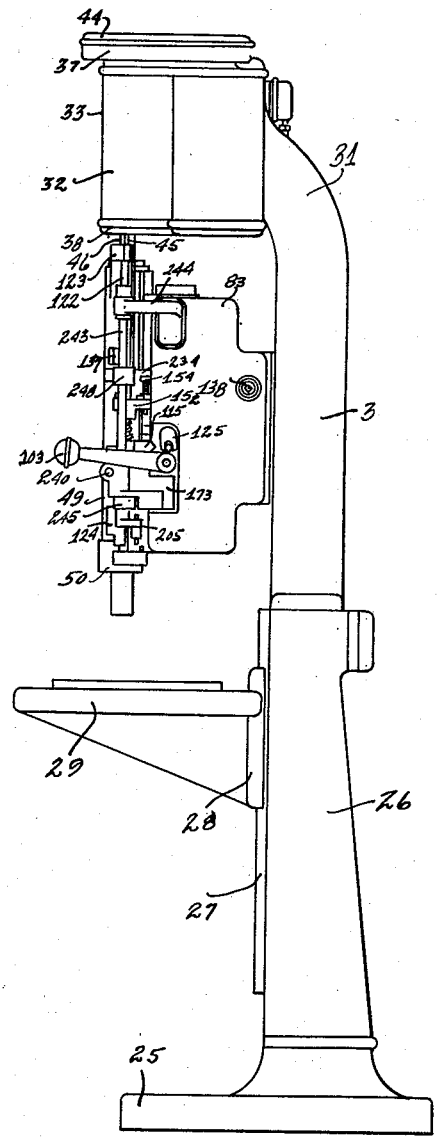
Fig. 1 is a side elevation of a drilling machine embodying the improvements of this invention.

As was noted above, this invention pertains primarily to control means for effecting step drilling operations, that is, drilling operations in which the drill is alternately fed into a work piece and retracted for chip clearance, when effecting long cuts, or operating on hard material which will not permit of a continuous operation. This invention is illustrated in the drawings as applied to a single spindle, high speed, vertical drilling machine, but it is to be understood that the invention may be applied to horizontal or other types of machine tools as well as multiple spindle drilling or other types of machine tools.

Specifically referring to the drawings, the machine therein comprises a base 25, from which rises a column 26. The column 26 is provided on its forward face with a dovetail V-guide 27 received in a correspondingly shaped guideway formed in a plate or bracket 28 of a table 29. The table 29 is adapted to support work pieces or the like to be operated on by the tool, and this table 29 is vertically adjustable relative to the column guideway 27 and it is therefore to be understood that any suitable means may be provided for effecting the vertical adjustment of the same.

Mounted on the column 26 is a second column 30 terminating at its upper end in a goose-neck 31 from which projects the spindle drive mechanism, indicated in the drawings by the reference numeral 32. The spindle drive mechanism is illustrated in section and detail in Fig. 4, to which reference is now to be had.

Figure 4:
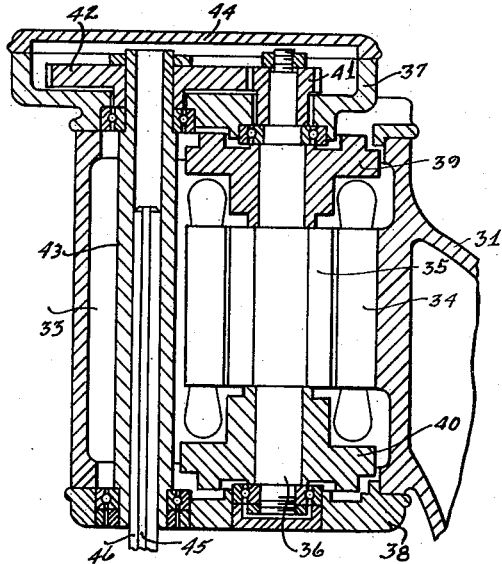
Fig. 4 is an enlarged, sectional view through the drive mechanism for the drill or other tool as seen from line 4—4 on Fig. 2.

As seen in Fig. 4, the spindle drive mechanism comprises a housing 33 in which is secured the stator 34 of an electric motor. Within the stator 34 is the rotor 35 secured to the central portion of a motor shaft 36. The motor shaft 36 is mounted at each end in suitable anti-friction bearings, respectively carried by a cap 37 and a lower cover plate 38. Adjacent each of the said bearings and disposed within the housing 33, the motor shaft 36 has secured to it, fans 39 and 40 for air cooling the motor during its operation. Above the anti-friction bearing, carried by the cap 37, the motor shaft 36 has keyed or otherwise secured to it a pinion 41. The pinion 41 is meshed with a gear 42 keyed or otherwise secured to a sleeve 43 disposed within the housing 33 and rotatably mounted in anti-friction bearings respectively carried by the cap 37 and the lower cover plate 38. The pinion 41 and gear 42 are changeable gears and may be inter-changed on their mountings or other pinions and gears substituted therefor to change the rate of rotation of the sleeve 43 as is well known in usual practice. The cap 37 is closed by means of a top cover plate 44. The sleeve 43 is provided interiorly thereof with a suitable key or keys adapted to enter a key-way or splines 45 formed in the exterior of the drill or other spindle 46 which telescopes with the said sleeve 43. The spindle 46 projects below the drive mechanism, and is journalled for rotation in an anti-friction bearing 47 and a quill 48 each carried by a spindle carrier 49, illustrated most clearly in Fig. 7. Below the quill 48 the spindle is provided with the usual socket 50 for the drill or other tool. In order to adjust the spindle and, therefore, the tool carried thereby, relative to the carrier 49, the quill is provided on one face thereof with rack teeth 51 meshing with a rack pinion 52 secured to which is the shaft 53 rotatably journaled in the carrier 49. Ahead of the carrier, the shaft 53 is provided with a knob 54 whereby said shaft and its pinion are rotated. To secure the quill in adjusted position the carrier 49 is split at its lower end, as at 55, and disposed on each side of the slit is an ear 56 through which passes a clamping bolt 57. The operation of this clamping mechanism is well understood.

Figure 5:
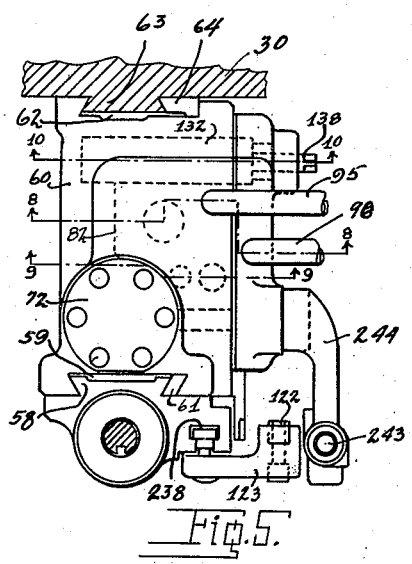
Fig. 5 is a top plan view of the drilling head as seen from the top of Fig. 3.
Figure 6:
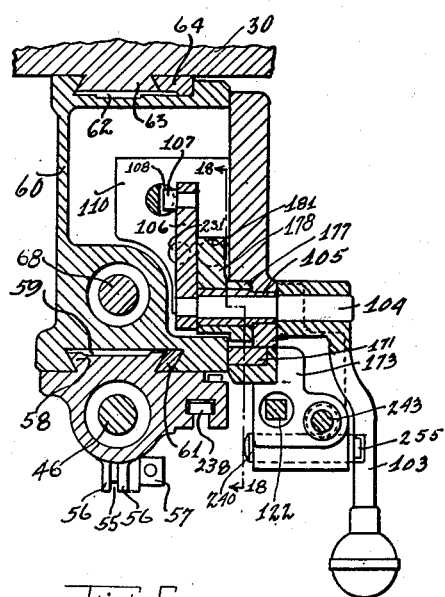
Fig. 6 is a horizontal, sectional view through the drilling head as seen from line 6—6 on Fig. 3.

The carrier 49 is provided on the rear end with a dovetail guide 58 received in a corresponding guide-way 59 formed in the forward face of the drill head housing 60; see Figs. 5 and 6. Disposed within the guide-way 59 and adjacent to the carrier guide 58 is a gib 61 for taking up play and wear as soon as it develops within the guide-way. The drill head housing 60 is provided in its rear face with a dovetail guide-way 62 receiving a similarly shaped tongue 63 projecting from the forward face of the machine column 30. Disposed in the guide-way 62 and adjacent to the guide-tongue 63 is a clamping gib 64 for securing the drill head in position on the column 30.

In practice, the drill head housing 60 is normally non-adjustable and immovable relative to the support column, while the carrier 49 is moved relative to the drill head to effect the movement of the tool toward the work, through the work and from the work. This carrier may be moved by any suitable or desirable means, but preferably by hydraulic means as illustrated in the drawings and as will now be described.

Figure 7:
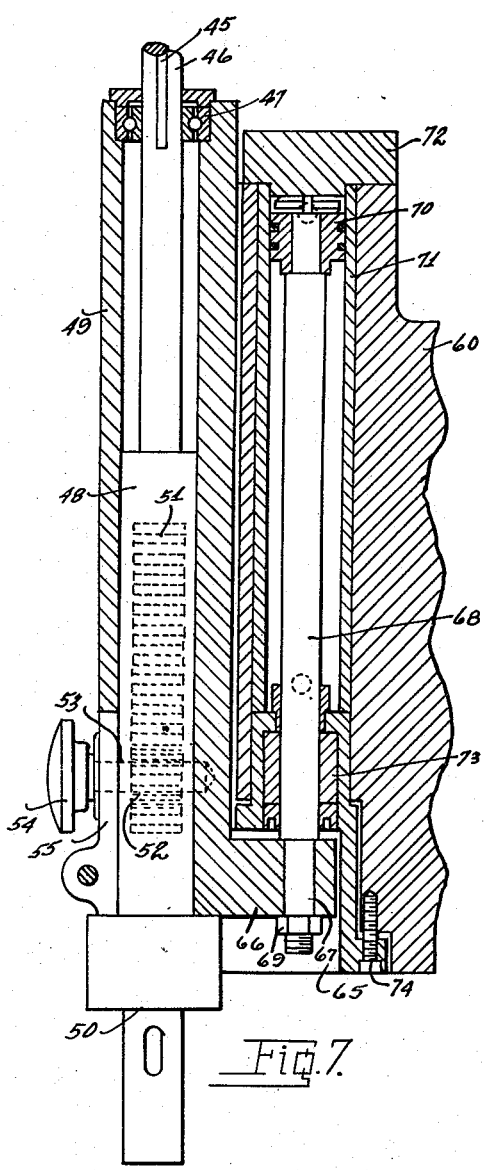
Fig. 7 is an enlarged, vertical, sectional view through the forward end of the drilling head, particularly illustrating the drill or tool carrier and means for effecting its reciprocation, as seen from line 7—7 on Fig. 2.

As seen in Fig. 7, the drill head housing 60 is provided in its lower end, immediately behind the carrier 49, with a recessed or cutout portion 65 into which projects a lug 66 integral with and projecting rearward from the carrier 49. The lug 66 is provided with an aperture, through which projects a reduced portion 67 of a piston rod 68. The lug 66 is secured to the reduced portion 67 by clamping same between a nut 69 and a shoulder at the other end of the reduced portion 67. Secured to the upper end of the piston rod 68 is a piston 70 adapted to be actuated through a sleeve or cylinder 71 mounted in a suitable bore in a drill head housing 60. The upper end of the cylinder 71 is closed by a cylinder head 72 which is secured by suitable cap screws or the like to the housing 60. The lower end of the cylinder 71 is closed by a suitable stuffing box construction 73 anchored against movement by the screw 74. The piston rod 68 passes through the stuffing box 73 in its movement for effecting the operation of the carrier 49.

The means for effecting and controlling the rate and direction of movement of the piston 70 relative to the cylinder 71 and therefore the movement of the carrier 49 is diagrammatically illustrated in Fig. 20 and these means will now be described with reference to the different structural views of the parts as they are encountered while describing the circuit and parts as illustrated in the diagrammatic view.

Accordingly, there is shown a sump or tank 75 which may be formed within the base 25 of the machine, or within the column 26 or may be a separate unit disposed entirely externally of the machine. Above the tank 75 is a pump 76 having the intake side thereof connected by a suction pipe or conduit 77 with the tank. Projecting from the other or discharge side of the pump 76 is the pressure pipe or conduit 78 which terminates at its other end in the main control valve, indicated in general in Fig. 20 by the reference numeral 79. The pressure pipe or conduit 78 has connected therewith one end of a by-pass pipe or conduit 80 which terminates at its other end in the sump or tank 75. The by-pass pipe or conduit 80 has therein a pressure relief valve 81 which is set to determine the operating pressure in the circuit.

Figure 8:
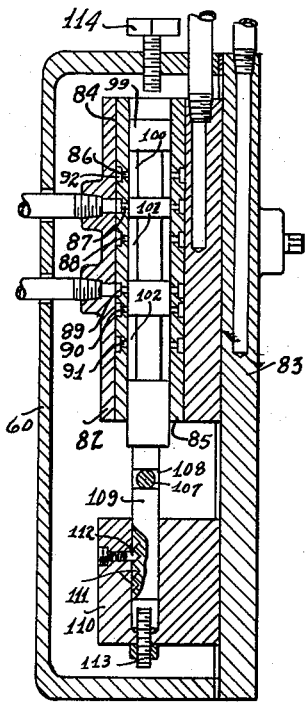
Fig. 8 is a vertical, transverse, sectional view through the drilling head, illustrating the main control valve, as seen from line 8—8 on Fig. 5.

The main control valve mechanism 79 is shown structurally in Fig. 8 and comprises a valve block 82 secured to the inner face of a plate 83 on the drill head housing 60 and interiorly of which the said valve block 82 is located. The valve block 82 is provided with a bore 84 in which is placed a valve sleeve 85. The valve sleeve 85 is provided with a plurality of sets of radial ports 86, 87, 88, 89, 90, and 91, each of which sets is encircled by a similar circumferential groove 92 disposed in the exterior of the valve sleeve.

Figure 20:
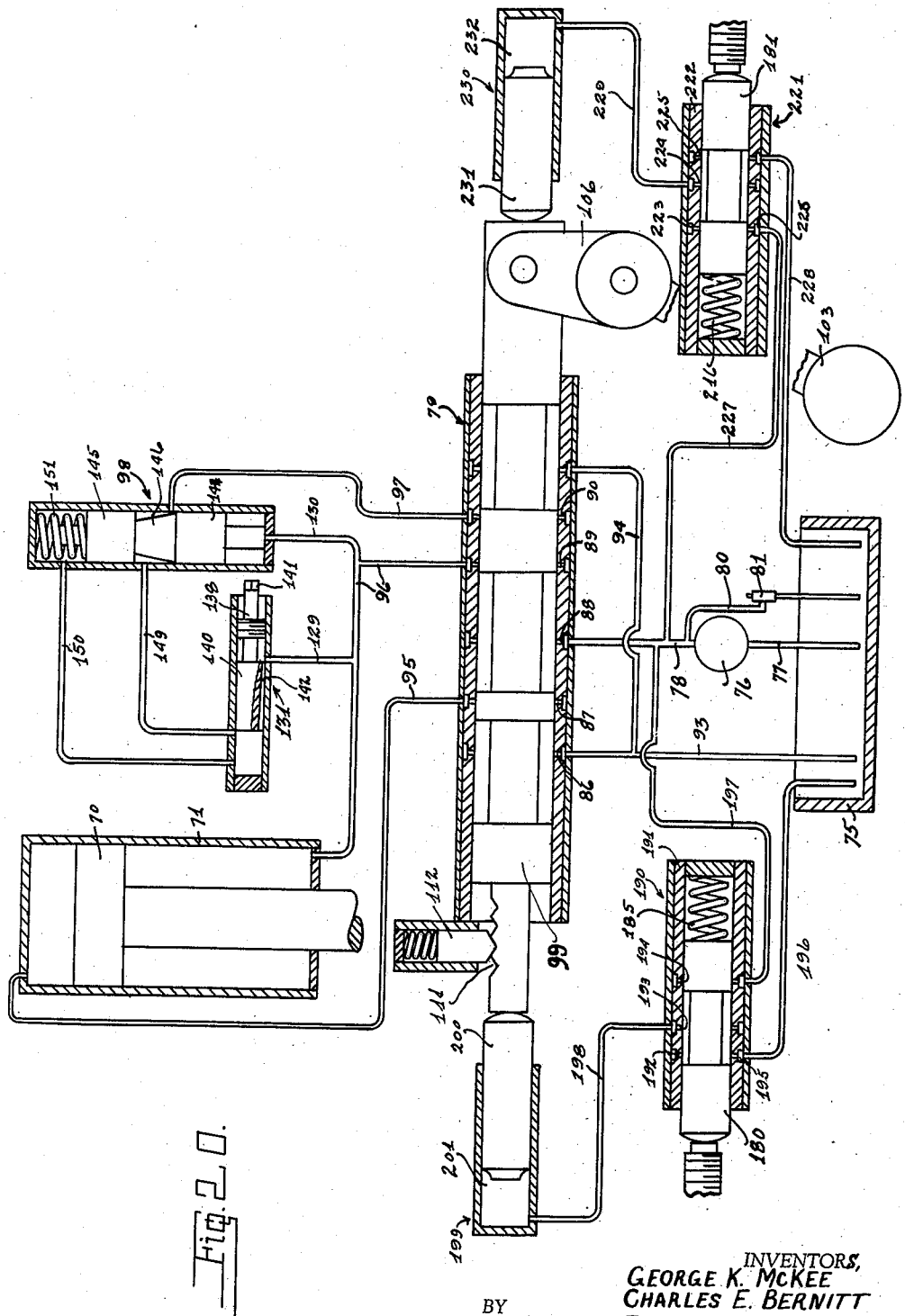
Fig. 20 is a diagrammatical view depicting the complete hydraulic circuit, utilized in effecting and controlling the movement of the drill or other tool carrier.

By referring to Fig. 20, it will be noted that it is with the radial ports 88 which the pressure pipe or conduit 78 connects. The ports 86 have connected therewith one end of a pipe or conduit 93 which is the return conduit, while the ports 91 have connected therewith one end of a supplementary return pipe or conduit 94 which terminates at its other end in the return conduit 93. The ports 87 have connected therewith one end of a pipe or conduit 95 which terminates at its other end in a port at the upper end of the cylinder 71, while ports 89 have connected therewith one end of a pipe or conduit 96 which terminates at a port at the lower end of said cylinder 71. The remaining set of ports 90 have likewise connected therewith one end of a pipe or conduit 97 which terminates at its other end in a balance valve mechanism indicated in general in Fig. 20 by the reference numeral 98. It should be noted at this time that while the several ports of the valves and cylinder have been described as connected to one another by pipe or conduit, these connections frequently take the form of ports interdrilled in the valve block 82 and they are to be so interpreted.

Disposed within the bore in the valve sleeve 85 is a sliding piston type valve 99 having formed throughout its length a plurality of cannelures or reduced portions 100, 101 and 102 adapted, when the valve is in different positions, to connect the ports through the valve sleeve in different combinations. The valve member has four operative positions which are; first, the stop position or that illustrated in the drawings; second, a position to the right of that shown in Fig. 20 and beneath that shown in Fig. 8 which is the return position for elevating the tool carrier or returning it to the starting position; third, a position to the left of that shown in Fig. 20 and above that shown in Fig. 8 which is the feed position or the position when the carrier is being moved downwardly at a slow feeding rate; and fourth, a position to the extreme left of that shown in Fig. 20 and extreme vertical position above that shown in Fig. 8 which is the rapid forward position or a position wherein the carrier is being actuated downwardly at a rapid rate of speed toward the work.

Figure 14:
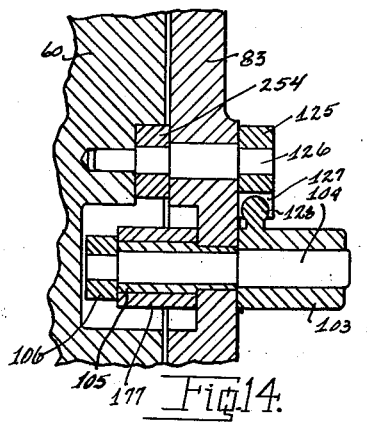
Fig. 14 is an enlarged, fragmentary, vertical, sectional view through parts of the drilling head as seen from line 14—14 on Fig. 3.
Figure 3:
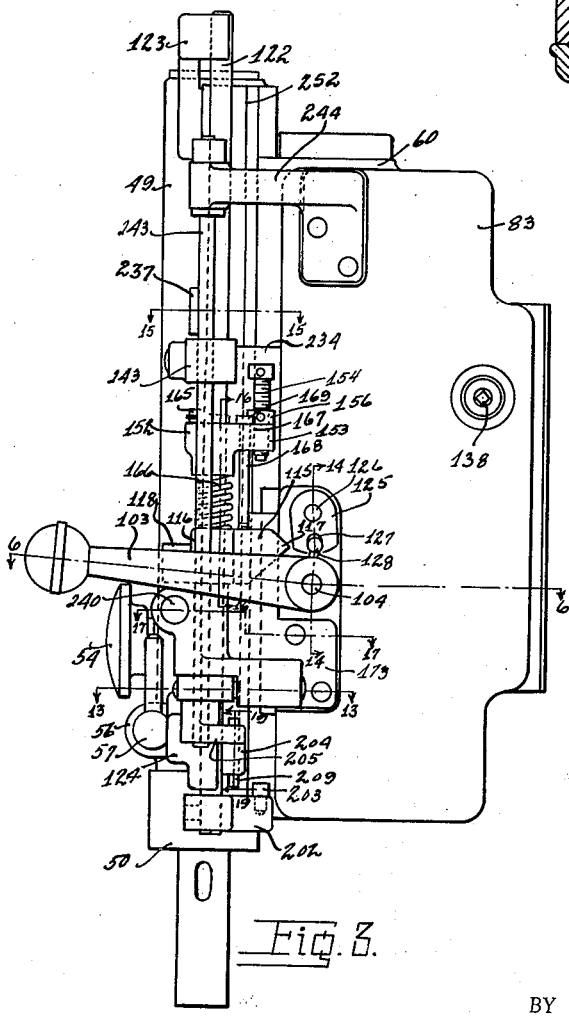
Fig. 3 is an enlarged, elevational view of the drilling head which contains the control mechanism for controlling the movement of the drill or tool mounted on said head.

The valve member 99 is moved to the various positions by manual and power means; the manual means being utilized for initially starting a cycle of movement and the power means for effecting a cycle when it is once started. This manual means, as shown in Figs. 3, 6 and 14, comprises a lever 103 which is pinned or otherwise secured to the outer end of a shaft 104. The shaft 104 is journalled in a bearing sleeve 105 carried by the drilling head plate 83 and projecting inwardly therefrom and pinned or otherwise secured to the inner end of the shaft 104 is an arm 106 which carries at its free end the valve shifter stud 107, see Fig. 6. The head of the valve shifter stud 107 is received in a transverse slot 108 formed in the valve stem 109 projecting downwardly from the valve member 99 as illustrated in Figs. 6 and 8. The valve stem 109 is journalled for sliding movement in a valve block 110 located beneath the valve block 82 and mounted in position within the head housing 60 being secured to the inner face of the housing plate 83.

In order to determine the several positions of the valve member 99 the valve stem 109 within the valve block 110 is provided with four notches 111 which cooperate with a spring pressed detent 112 carried by the said valve block 110. In addition, the valve block 110 carries an abutment screw 113 which determines the ultimate or final position of the valve member in one direction which is the reverse position of the valve or position No. 2 above described. The other limit of movement of the valve member is determined by a second abutment screw 114 threaded through the upper end or wall of the drill head housing 60 and this position of the valve is the rapid rate position or position No. 4, as above described.

With the parts in the position illustrated in the drawings, the lever 103 is actuated in a clockwise direction about the axis of the shaft 104 as seen in Fig. 3. This will, of course, shift the valve member 99 downwardly to the limit of its movement and effect a rapid movement of the piston 70 and, therefore, the spindle carrier 49. The flow of the hydraulic medium, see Fig. 20, is by way of the main pressure pipe or conduit 78 to the port 88 of the valve mechanism 79, through the cannelure or reduced portion 101 of the valve member 99 to the ports 89 and the pipe or conduit 96. The flow continues through the pipe or conduit 96 to the lower end of the cylinder 71 and acts on the under-surface of the piston 70 for elevating same. The fluid ahead of the piston is forced out through the pipe or conduit 95 to the ports 87 of valve mechanism 79 through the cannelure or reduced portion 100 to the port 86, discharge pipe or conduit 93 and sump or tank 75. This upward movement of the piston 70, and parts actuated thereby continues until the valve member 99 is shifted either automatically or manually to the position illustrated in the drawings, or is shifted to a position for effecting the downward movement of the parts.

In the normal operation of the machine and with the valve mechanism in the positions shown in the drawings the tool carrier is in its uppermost position and a work piece is placed on the work supporting table 29, and it is in this position the parts will be assumed for further description. The handle 103 is now grasped and actuated in a counterclockwise direction about the axis of the shaft 104, as seen in Fig. 3. This movement of the handle 103 shifts the valve member 99 to its extreme left hand position, as seen in Fig. 20 or its extreme uppermost position, as seen in Fig. 8. With the valve in this position, the flow of the hydraulic medium is from the pump 76 through the pressure conduit 78 to the valve mechanism 79 where it is connected, by the cannelure or reduced portion 101, of the valve member 99, with the pipe or conduit 95 and the upper end of the cylinder 71. The piston 70 is thereby driven downwardly forcing the medium ahead of the piston from the cylinder 71 through the pipe or conduit 96 to the valve mechanism 79, where the said medium is connected, by way of cannelures or reduced portion 102, of the valve member 99, with the supplementary discharge pipe or conduit 94 and pipe or conduit 93 and therefore the tank or sump 75. This movement of the piston continues until the valve member 99 is shifted.

The shifting of the valve member 99 is effected automatically by means of a dog mounted on the carrier 49. As seen in Figs. 3, 16 and 18, this rapid traverse dog 115 comprises a sleeve-like body portion 116 from one side of which projects a nose 117, while from the other side projects a lug 118. The lug 118 is hollow and has mounted therein a friction shoe 119, backed up by a spring 120 whose tension may be varied by a threaded end plug 121. The friction shoe 119 bears against one side of a rod 122 mounted at its upper end in a bracket 123 secured to the carrier 49, and at its lower end in a bracket 124 likewise carried by the carrier 49. This rod 122 will hereinafter be referred to as the cumulative dog rod. The rapid traverse dog is positioned in the first instance on the rod 122 at a point just before the drill or other tool in the socket 50 contacts the work and when this point is reached, the nose 117 thereof engages the adjacent face of a flipper member 125 which is keyed or otherwise secured to the outer end of a shaft 126 journalled in the drill head plate 83. As will be seen in Fig. 3 the flipper member 125 is provided, at its lower end, with a notch 127 in which is disposed the ball ended lug 128 projecting from the hub of the lever 103. From this, it will be seen that any movement imparted to the flipper 125 will be transmitted to the lever 103 and any parts carried thereby, and conversely any movement given to the lever 103 will be transmitted to the flipper 125.

This movement of the flipper 125 through the parts connected with the lever 103 shifts the valve member 99 toward the right or to the third position above referred to which, as was noted above, is the feeding position and causing the tool to travel through the work at the proper feeding rate during the tooling thereof. At this time, the flow of the hydraulic medium through the valve mechanism 79 by way of the pipe or conduit 96 is stopped and this flow is shunted through pipes or conduits 129 and 130. The former of the pipes or conduits terminates in a metering valve mechanism indicated in general in Fig. 20 by the reference character 131, while the latter of the conduits terminates in the balance valve mechanism 98. It is the metering valve mechanism 131 which determines the rate of feed of the drill or tool and this mechanism is structurally illustrated in Fig. 10, to which reference is now to be had.

Figure 10:
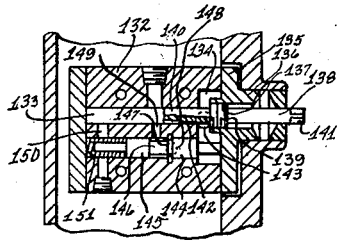
Fig. 10 is a fragmentary, vertical, sectional view through a portion of the drilling head taken on a plane behind the plane of Fig. 8 on line 10—10 on Fig. 5.

As seen in Fig. 10, the metering valve mechanism 131 comprises a block 132 which is secured to the rear surface of the valve block 82 as seen in Fig. 5. The block 132 is provided therein with a bore 133 which communicates at one end with a chamber 134 formed in the block 132. The chamber 134 is closed by a cap plate 135 having projecting therefrom a lug 136 and having an internally threaded bore 137. The threaded bore 137 is in axial alignment with the bore 133 in the block 132 and disposed in these aligned bores is the metering valve member 138. The valve member 138 is provided intermediate its ends with an enlarged portion 139 threaded in the bore 137 and projecting from one side of the enlarged portion 139 is the valve portion 140, while projecting from the other side is the stem 141 utilized in adjusting the position of the valve member relative to the bore 133. The valve portion 140 has formed longitudinally thereof, a groove 142, which increases in depth as it runs from the enlarged portion 139 to the free end thereof. This groove 142 controls the rate of flow from the chamber 134 through the valve port 133 and therefore controls the return of flow through the whole system during the feeding of the tool. Entering the chamber 134 is a port 143 and, it is with this port that the pipe or conduit 129 connects.

The balance valve mechanism 98 is employed to control the rate of flow through the system as established by the meter valve mechanism and prevents any fluctuation of flow in the system which may be caused either by extra hard portions in the work or by soft or void portions therein. This balance valve mechanism is structurally illustrated in Fig. 10, and as there shown, utilizes the same valve block 132 which houses the metering valve mechanism. This balance valve structure comprises a valve member 144 disposed in a second bore 145 in the block 132. The valve member 144 is of the piston type and has formed thereon a cannelure or reduced portion 146 which, through a conical shoulder 147 at one end thereof, controls the flow through a port 148. Communication is had between the metering valve bore 133 and balance valve bore 145 by means of a port 149. In addition, the metering valve bore 133 communicates, by means of a port 150 with the balance valve bore 145 at a point ahead of the valve member 144. Disposed in the portion of the balance valve bore 145 ahead of the valve member 144 is a spring 151 which cooperates with the fluid on this side of said valve member and supplied by way of the port 150. The other or rear end of the balance valve member 144 communicates with the chamber 134 and is therefore subjected to the pressure entering said chamber by way of the pipe or conduit 129.

It is believed that the operation of this balance valve is understood by those conversant with this art and, briefly, is as follows:

The flow into the chamber 134 is greater than the outward flow through the groove 142 which causes a build up of pressure on the valve member 144 for shifting it to a position for restricting the flow through the port 148. At the same time, the flow through the groove 142 into the bore 133 flows through the port 150 and builds up a pressure which cooperated with the spring 151 for shifting the valve member 144 against the pressure in the chamber 134. These forces shortly balance one another to a point for effecting the flow through the port 148 at a rate in accordance with the setting of the meter valve member 138. Should, for some reason or other, the carrier tend to coast ahead, the increased flow into the chamber 134 would shift the balance valve member 144 to further restrain the flow through the port 148 and thereby prevent the said coasting. On the other hand, should the carrier tend to slow up, the reduced flow into the chamber 134 would reduce the pressure on the balance valve member 144 and thereby permit the spring 151 to shift the balance valve member 144 to open the flow through the port 148 and bring the rate of movement of the carrier up to its normal rate of movement.

It should be noted at this time that the ports 149 and 150 connecting the bores of the meter valve member 138 and balance valve member 144 with one another are shown on Fig. 20 as pipes or conduits bearing the same reference numerals. It should also be noted that the outlet port 148 from the bore 145 is the port with which the pipe or conduit 97 from the valve mechanism 79 is connected and that, in practice, the pipe 97 is a port connecting between the main valve block 82 and the valve block 132.

Continuing the description of the flow of the hydraulic medium when the carrier is being actuated at a feeding rate of speed, the flow is from the cylinder 71 through the pipe or conducit 96, branch pipe or conduit 129, restricted passage or groove 142 to the ports, pipe or conduits 149 and 150 to the balance valve mechanism 98. The flow through this mechanism, as described above, is determined by the setting of the meter valve member 138 to the pipe or conduit 97 and main valve mechanism 79. The medium is connected through the valve mechanism 79 with the discharge pipe or conduit 94 and discharge pipe or conduit 93 and therefore the sump or tank 75.

The tool carrier continues to move at this relatively low feeding rate of speed until the valve member 99 is again shifted. This shifting of the valve now takes place by power means, entirely dissociated from the carrier, but which power means is controlled or operated by the carrier.

For this purpose there is mounted on the cumulative stop dog bar, a dog 151, illustrated in Figs. 3, 15, 16 and 18 and comprises a body portion 152 through which is formed the aperture for the rod 122. Projecting from the body portion 152 is an arm 153 through which is threaded a trip or dog screw 154 having a terminal or nose portion 155. The dog screw 154 is adjustable through the arm 153 to determine the amount of feeding movement which the carrier is given, prior to reversal, and the screw is locked in position by a lock-nut 156. Opposite one face of the cumulative dog bar 122 the dog 151 is provided with a slot 157, see Fig. 16. Disposed within said slot is a ratchet pawl 158 pivoted at 159 intermediate its ends to the dog 152. The pawl 158 is provided at its lower end with a tail or lug 160 which projects beyond the body lines of the dog 151. The upper end of the pawl 158 is provided with a nose 161 adapted to successively engage the ratchet teeth 162 formed in one face of the rod 122. Projecting from the pawl 158 adjacent to the nose 161 is the pin 163 forming an anchor for one end of a coil spring 164 which has its other end anchored to a pin 165 projecting from a dog 151. The spring 164 at all times urges the pawl 158 in a clockwise direction about the pivot 159 and thereby maintains the nose 161 in proximate engagement with the ratchet teeth 162.

As seen in Fig. 18 the rapid traverse dog 115 is spaced beneath the feed dog 151 and these dogs are normally spaced from one another by an expansion spring 166 which abuts on its lower end with the upper surface of the rapid traverse dog 115 and on its upper end with the under surface of the feed dog 152. In order to limit the space between these dogs the arm 153 of the feed dog is provided with a bore 167 through which extends the body portion of a stud 168. The stud 168 has its one end threaded into the rapid traverse dog 115 and has its upper end provided with a head 169 which lies on the upper surface of the feed dog 152. From the foregoing it will be seen that this stud 168, being carried by the rapid traverse dog 115 limits, through the head 169, the separation of the rapid traverse and feed dogs, as effected by the spring 166.

Shortly after the rapid traverse dog 115 has changed the rate of movement of the carrier from rapid to feeding rate, depending of course upon adjustment of trip or dog screw 154, the tip or nose 155 of the dog screw engages the upper end 170 of a slide 171 for shifting the main valve member 99 from its feeding position to its return position, which is the position to the right of that shown in Fig. 20 and beneath that shown in Fig. 8. This shifting of the valve is effected as follows.

Figure 11:
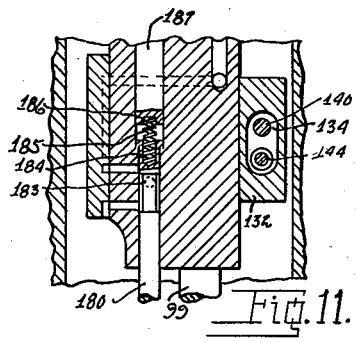
Fig. 11 is a fragmentary, sectional view taken at right angles to Fig. 9 on line 11—11 on said Fig. 9.
Figure 12:
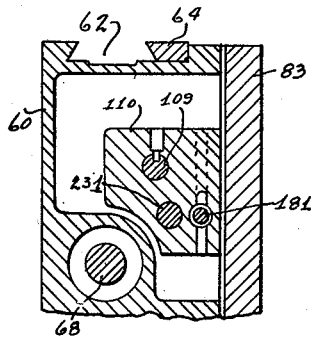
Fig. 12 is a fragmentary, transverse, sectional view taken on line 12—12 of Fig. 9.

The slide 171 is mounted in a guide-way formed by an arm 172 projecting from a bracket 173 and opposed to the forward face 174 of the drill head plate 83 as seen most clearly in Figs. 13 and 17. As seen in Fig. 18 the slide 171 is provided on its inner face with rack teeth 175 meshing with a segmental rack pinion 176 integral with or secured to hub 177 of a short arm 178. The hub 177 is mounted for oscillatory or rotation movement on the bearing bushing 105 which, as noted above, is carried by the drill head plate 83 and projects interiorly thereof. The arm 178 of the hub 177 has its free end 179 disposed at a point inwardly of the hub 177 and has contacting same on opposite sides thereof plungers 180 and 181. These plungers are, in reality, valve stems, shown structurally in Figs. 9, 11 and 12, and diagrammatically in Fig. 20 and the description will now be continued with reference to the plunger 180 which effects the present shifting of the main valve 99 and which is operated through the slide 171 and trip or dog screw 154.

Figure 9:
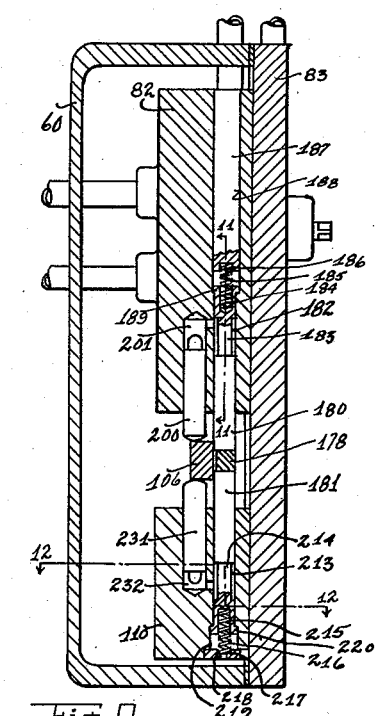
Fig. 9 is a vertical, transverse, sectional view through the drilling head taken on a plane forwardly of the plane of Fig. 8 as seen from line 9—9 on Fig. 5.

The plunger or valve stem 180 has integrally connected with its inner end the valve member and is mounted for movement in a bore 182 formed in the valve block 82, as seen in Fig. 9. The said valve is provided with a reduced portion or cannelure 183 and is further provided at its extreme inner end with a counterbored portion 184 in which is mounted one end of a spring 185. The spring 185 is disposed at its other end in a spring seat 186 formed in a spring abutment member 187. The spring abutment member 187 is rigidly mounted in a bore 188 formed in the valve block 82 and in axially alignment with the valve bore 182. These bores are, however, of different diameters thereby forming a shoulder against which an enlarged portion 189, on the valve abuts to limit the movement thereof, as effected by the spring 185.

This valve mechanism just described, is diagrammatically illustrated in Fig. 20 and is referred to in general by the reference numeral 190. As here shown, the valve member is disposed within the sleeve 191 which is mounted in a casing, such as the valve block 82, although, in practice, this sleeve may be dispensed with. Formed through the sleeve is a plurality of sets of radial ports 192, 193 and 194 each of which is encircled by a circumferential groove 195 formed in the exterior of the sleeve 195. Connecting with the ports 192 is one end of a pipe or conduit 196 which terminates at its other end in the sump or tank 75 while the ports 194 have connected therewith one end of a pipe or conduit 197 which extends from the pressure pipe or conduit 78. The remaining set of ports 193 have connected therewith one end of a pipe or conduit 198 which terminates at its other end in a piston mechanism, indicated in general in Fig. 20 by the reference numeral 199.

This piston mechanism 199 is shown structurally in Fig. 9 and comprises a piston 200 disposed in a bore or cylinder 201, formed in the valve block 82. As shown in Fig. 9, the piston 200 abuts on its free end with the upper face of the valve shifter arm 106 while, as shown diagrammatically in Fig. 20, this piston 200 abuts directly with the adjacent end of the valve member 99. It will be appreciated that movement of the piston will, either directly or through the connection of the arm with the valve, effect the shifting of the valve. The movement of the valve as effected by the piston 200 is to the extreme right hand position as seen in Fig. 20 or the lower-most position as seen in Fig. 18, which is of course the reverse position, and effects the rapid return of the carrier and parts carried thereby.

It is believed that this operation is readily understood without a detail description of its operation, when it is remembered that engagement of the trip or dog screw 154 with the slide 171 operates the arm 178, thereby connecting the pressure through the pipe, conduit, port or the like 197 with the pipe or conduit 198 and thereby shifting the piston 200. As soon as the piston 200 positions the valve member 99, the spring pressed plunger 112 holds the valve in this position and, upon retraction of the carrier, the dog screw leaves the slide 171, whereupon the spring 185 returns the valve to the position illustrated in the drawings, thereby connecting the rear end of the piston with the sump and relieving the pressure thereon so as not to interfere with the subsequent movement of the valve which is opposite to that just described.

This upward or retracting movement of the carrier continues to a point which is substantially the point from which the initial movement took place but is in fact a short distance below the point for a reason to be later described. The means for stopping the upward or retracting movement of the carrier is as follows.

Figure 19:
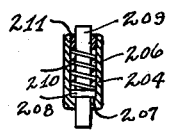
Fig. 19 is an enlarged, sectional view through a valve shifting part as seen from line 19—19 on Fig. 3, and forming a detail of the invention.

The cumulative dog rod 122 has secured to its lower end an arm 202, from which projects a pin 203. This pin 203 is adapted in its upward movement to shift the slide 171 in a reverse direction from that above described and operates through a yieldable pin mechanism most clearly illustrated in Fig. 19. This pin mechanism comprises a housing 204, which is in reality the outer end of an arm 205, see Figs. 3 and 13. The housing 204 is provided therethrough with a counter bore 206, thereby providing a shoulder 207. Resting on the shoulder 207 is the enlarged collar portion 208 of a pin 209, which projects above and below the housing 204. Resting on the upper face 208 is one end of a spring 210 which abuts at its other end a plug 211, which closes the counterbore 206; the spring 210 at all times urging the pin 209 downwardly to the position shown in Fig. 19. When the parts are in normal position the pin 209 is in axial alignment with 203 and these pins underlie the lower face 212 of the slide 171; the pin 209 being in close proximity thereto, while the pin 203 is brought into engagement with the pin 209 upon the upward movement of the carrier. As soon as the carrier gets to the upper point, the slide 171 is shifted this time upwardly and causing the arm 178 to depress the plunger or valve stem 181.

The valve stem 181, similar to the valve stem 180, has integrally with, or secured to its inner end, the valve and is mounted in a bore 213; formed in the valve block 110. This valve is substantially identical with the valve stem 180 and has intermediate its ends a cannelure or reduced portion 214 and is provided in its extreme end with a counterbore 215. Seated in this counterbore 215, is one end of a spring 216 which has its other end disposed in a spring seat 217 formed in a spring abutment 218. The spring abutment 218 is secured in a bore 219 which is in axial alignment with the bore 213. These bores 219 and 213 are of different diameters, thereby providing a shoulder, against which an enlarged collar portion 220 on the valve, abuts to limit its movement as effected by the spring 216.

This valve mechanism is diagrammatically illustrated in Fig. 20 and indicated in general by the reference numeral 221 and as there shown is substantially identical in construction with the valve mechanism 190. This valve mechanism is again illustrated as including a valve sleeve 222 pressed into a casing or valve block, which casing may be dispensed with as illustrated in Fig. 9. The sleeve 222 is shown as having a plurality of sets of radio ports 223, 224 and 225, all entering the valve bore 213 and each set of ports being encircled by a circumferential groove 226 formed in the exterior of the sleeve 222. Connected with the ports 223 is one end of a pipe or conduit 227 which has its other end connected with the pressure pipe or conduit 78. The ports 225 have connected therewith one end of a pipe or conduit 228 which terminates at its other end in the sump or tank 75. The remaining set of ports 224 have connected therewith one end of the pipe or conduit 229 which terminates at its other end in a piston mechanism, indicated in general by the reference numeral 230 which is similar in all respects with the piston mechanism 197. This piston mechanism 230 is illustrated structurally in Fig. 9 and as there shown comprises a piston 231 mounted in a cylindrical bore or cylinder 232 formed in the valve block 110.

The operation of this mechanism is identical with the operation of the piston mechanism 199 since either it abuts directly with the valve member as illustrated in Fig. 20 or with the valve shifter arm, as illustrated in Fig. 9. The valve member 99 is shifted to its other extreme position, which is to the left, as seen in Fig. 20 or upwardly as seen in Fig. 8. Again, as soon as the carrier is moved and restraint taken from the slide 171 the valve is returned to its normal position by the spring 215 to relieve the pressure from the piston 231 and offers no interference to the subsequent movement of the valve member.

With the valve in the position to which it has now been shifted, the carrier is again started downwardly at a rapid rate of speed and continues at this rate of speed until the rapid traverse dog 115 shifts the valve to the position above described, thereby changing the rate of movement of the carrier to a relatively slow feeding rate of speed. The point of change in the rate of movement is now below that initially since the tool is carried at the rapid rate to the point where the previous tooling operation stopped. This increase in rapid traverse distance was occasioned by allowing the rapid traverse dog to slide relative to the dog bar 122 even though the feeding dog was connected with the bar and continuing to move therethrough the rack and pawl mechanism 158—162. The rapid traverse dog was held against movement by a face 233 on the bracket 173 upon which it rests, immediately after shifting the valve to its slow feeding rate of speed. In order to return the feed dog to its initial position after each feeding stroke the drill head has secured to it a cam plate 234 provided at its forward end with cam faces 235 and 236, the latter of which, during the return of the carrier, engages the tail or lug 160 of the pawl 158 for actuating the same in a counterclockwise direction, thereby disengaging the pawl nose 161 from the ratchet teeth 162 and permitting the spring 166 to expand and establish the initial spacing of the rapid traverse dog and feed dog, as determined by the connecting stud 168. It will therefore be appreciated that during the feeding stroke the rapid traverse dog 115 is held with respect to the movement of the dog rod 122 while the feed dog is moved therewith, due to the positive connection established by the ratchet and pawl mechanism 156—162. Upon the completion however of a feeding stroke the parts are again returned to their original positions, whereupon the carrier is actuated at a rapid rate to the point where the previous tooling operation stopped and a second tooling operation performed. As soon as the trip or dog screw 154 again actuates the slide 171 for reversing the movement of the carrier, the carrier is rapidly returned to its initial position and again reversed through the pins 203—209 and slide 171. This cycle of rapid movement to the point where where the previous drilling or tooling operation stopped, followed by a tooling or drilling operation and a rapid return is continued until the piece is completely finished. This is determined by a dog 237, adjustably secured to the carrier 49. This dog may be referred to as the stop dog since it stops the operation of the machine until again manually started, as above described. The stop dog 237 positions the parts, which eventually shifts the valve member 99 to the position shown in the drawings, through the means now to be described.

The stop dog 237 is adjustably mounted in a slot 238 formed vertically of the carrier 47 and is positioned to go into operation as soon as the drill or tool has completed its work. This dog 237 is formed to provide a cam face 239, which engages with the projecting end of a short rack 240, slidably mounted in a suitable bearing, provided in the bracket 173. The rack 240 has its teeth 241 meshing with a rack pinion 242 keyed or otherwise secured to an oscillatable bar 243, as shown most clearly in Fig. 17. The bar 243 is laterally spaced from the cumulative stop rod 122 and the said bar has its opposite ends journalled by oscillatory movement in the bracket 173 and a second bracket 244, secured to the drill head plate 83. The oscillatory rod 243 has two operative positions; first, as shown in the drawings, and second, a position oscillatably spaced in a clockwise direction from that shown. In order to determine these positions, the said rod has secured to it, beneath the bracket 173, a positioning member 245 which is provided in its one end with positioning notches 246 co-operating with a spring pressed detent 247, mounted in a suitable bore in the bracket 173.

Beneath the positioning member 245 the rod 243 has secured to it the arm 205, which carries at its outer end the pin 209, and the oscillation of which rod 243 positions the arm 205 and, therefore, its pin 209 into and out of alignment with the pin 203 on the cumulative stop rod 122. The rod 243 has further adjustably secured to it, intermediate its ends, a dog 248 having a projecting nose portion 249 adapted, when in the position shown in the drawings, to overlie a lug 250, projecting from the adjacent edge of the rapid traverse dog 115.

Figure 15:
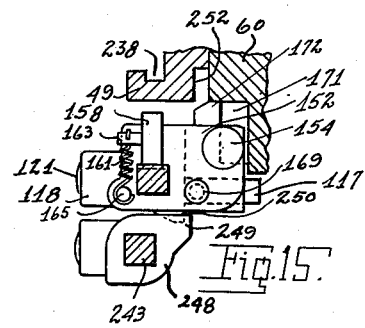
Fig. 15 is a fragmentary view, partly in elevation, and partly in section, illustrating certain of the central parts as seen from line 15—15 of Fig. 3.

The operation and purpose of this mechanism is as follows. When the work piece has been completely tooled, the stop dog 237, through its cam face 239 engages the end of the rack 240 for shifting it to the position shown which is a downward movement as seen in Fig. 7 or a movement to the right as seen in Fig. 2. This movement of the rack 240 effects an oscillation of the bar 243 in a counterclockwise direction, thereby positioning the pin arm 205 as shown in Fig. 13 and positioning the dog 248 as shown in Fig. 15. The arm 205 removes its pin 209 from the path of movement of the pin 203, thereby preventing the operation of the slide 171 and the operation of the main valve member 99, as above described. This then would ordinarily permit the carrier 48 to move upwardly to a position beyond that at which the previous reversal took place and such a movement is permitted, but only for a very short distance.

The return movement of the carrier 48 is now interrupted by a pin 251, which projects inwardly of the carrier from a face 252, provided on the carrier and spaced a short distance from the face of the drill head housing, as seen most clearly in Figs. 17 and 18. This pin 251 is adapted to engage a lug 253 projecting from the free end of an arm 254, keyed or otherwise secured to the inner end of the shaft, the outer end of which carries the flipper 125. This movement of the arm 254 is in a clockwise direction, as seen in Figs. 3 and 18 which is of course the same movement imparted to the flipper 125 and through its slot and tongue arrangement 127—128 causes the counterclockwise movement of the arm 103 for positioning the main valve member, as shown in the drawings, and stopping the movement of the carrier 48.

The positioning of the dog 248 on the bar 243, as shown in Fig. 15, causes, during this return movement of the carrier 48 through the overlapping of the dog nose 249 and lug 250, the holding of the rapid traverse dog 115 during the movement of the carrier and this holding of the rapid traverse dog through the stud connection of the feed dog also holds it. This arrangement results in the repositioning of the rapid traverse dog and feed or cumulative feed stop dog, relative to the carrier after the completion of each work piece.

The shifting of the main valve member 99 to the stop position shown, positions the starting lever 103 as shown in Fig. 3, that is, in a plane above the rack 240. As soon as a new work piece has been mounted on the table 29 the feed lever is actuated downwardly or in a counterclockwise direction and this movement through a cam 255 engages the other end of the rack 240 for shifting it upwardly as seen in Fig. 17, or to the left as seen in Fig. 2, thereby oscillating the bars 243 to the position for removing the dog nose 249 from the path of movement of the lug 250 and positioning the arm 205 to have its pin 209 in position to be actuated by the cumulative stop rod pin 203; whereupon the cycle of movement again continues until the work piece now being operated upon is completed, as above described.

It is believed that the operation of this mechanism is understood from the foregoing description and that a further description of the operation is unnecessary.

From the foregoing, it will now be appreciated that there has been provided a cumulative stop mechanism for effecting step drilling in which the parts are at all times positively connected with one another without dependance upon purely frictional engagement of the parts to accomplish the same. It will further be noted that there has been provided a mechanism in which each step of the tooling operation is adjustable instead of having the same time duration for each work piece as would be the result, if a fixed cam bar or the like were utilized. It should also be noted that, with the mechanism here employed, the change in rate and direction of movement of the carrier takes place instantly without any danger of over-run and that the machine can, therefore, be very accurately set up and adjusted. It will also be noted that the mechanism or means for accomplishing the above results are relatively simple in their construction and operation, and that involved mechanisms or devices have been dispensed with.

What is claimed is:

1. In a drilling machine of the class described, the combination of a tool carrier, power means for shifting said carrier at successive rapid and feeding rates in one direction, and at a rapid rate in the other direction, and cumulative stop means for determining the amount of rapid and feed movement to be imparted to the carrier for each cycle, and for increasing the length of duration of each succeeding cycle by an amount equal to the time of the feed movement of this preceding cycle, comprising a dog bar on the carrier, a rapid movement dog frictionally engaging said bar for determining the amount of rapid movement to be imparted to the carrier, a second dog on said bar for determining the amount of slow movement to be given said carrier, and for reversing the direction of movement thereof at the end of each feed movement, and means for mechanically connecting the slow movement dog to the dog bar to cause same to move therewith after the rapid dog has been stopped.

2. In a drilling machine of the class described, the combination of a tool carrier, power means for shifting said carrier at successive rapid and feeding rates in one direction, and at a rapid rate in the other direction, and cumulative stop means for determining the amount of rapid and feed movement to be imparted to the carrier for each cycle, and for increasing the length of duration of each succeeding cycle by an amount equal to the time of the feed movement of this preceding cycle, comprising a dog bar on the carrier, a rapid movement dog frictionally engaging said bar for determining the amount of rapid movement to be imparted to the carrier, a second dog on said bar for determining the amount of slow movement to be given said carrier, and for reversing the direction of movement thereof at the end of each feed movement, and means for mechanically connecting the slow movement dog to the dog bar to cause same to move therewith after the rapid dog has been stopped, said slow movement dog including an adjustable trip member, whereby the duration of the slow movement after the rapid movement may be varied.

3. In a drilling machine of the class described, the combination of a tool carrier, power means for shifting said carrier at successive rapid and feeding rates in one direction, and at a rapid rate in the other direction, and cumulative stop means for determining the amount of rapid and feed movement to be imparted to the carrier for each cycle, and for increasing the length of duration of each succeeding cycle by an amount equal to the time of the feed movement of this preceding cycle, comprising a dog bar on the carrier, a rapid movement dog frictionally engaging said bar for determining the amount of rapid movement to be imparted to the carrier, a second dog on said bar for determining the amount of slow movement to be given said carrier, and for reversing the direction of movement thereof at the end of each feed movement, means for mechanically connecting the slow movement dog to the dog bar to cause same to move therewith after the rapid dog has been stopped, yieldable means for normally spacing the rapid dog from the slow dog which is compressed during the slow movement of the carrier, and means for disconnecting the mechanical coupling between the slow dog and dog bar at the end of the slow movement of the carrier.

4. In a drilling machine of the class described, the combination of a tool carrier, power means for shifting said carrier at successive rapid and feeding rates in one direction, and at a rapid rate in the other direction, and cumulative stop means for determining the amount of rapid and feed movement to be imparted to the carrier for each cycle, and for increasing the length of duration of each succeeding cycle by an amount equal to the time of the feed movement of this preceding cycle, comprising a dog bar on the carrier, a rapid movement dog frictionally engaging said bar for determining the amount of rapid movement to be imparted to the carrier, a second dog on said bar for determining the amount of slow movement to be given said carrier, and for reversing the direction of movement thereof at the end of each feed movement, means for mechanically connecting the slow movement dog to the dog bar to cause same to move therewith after the rapid dog has been stopped, yieldable means for normally spacing the rapid dog from the slow dog which is compressed during the slow movement of the carrier, and means for disconnecting the mechanical coupling between the slow dog and dog bar at the end of the slow movement of the carrier, and means for limiting the separation of the rapid and slow dogs as effected by the yielding means.

5. In a drilling machine of the class described, the combination of a tool carrier, power means for shifting said carrier at successive rapid and feeding rates in one direction, and at a rapid rate in the other direction, and cumulative stop means for determining the amount of rapid and feed movement to be imparted to the carrier for each cycle, and for increasing the length of duration of each succeeding cycle by an amount equal to the time of the feed movement of this preceding cycle, comprising a dog bar on the carrier, a rapid movement dog frictionally engaging said bar for determining the amount of rapid movement to be imparted to the carrier, a second dog on said bar for determining the amount of slow movement to be given said carrier, and for reversing the direction of movement thereof at the end of each feed movement, and means for mechanically connecting the slow movement dog to the dog bar to cause same to move therewith after the rapid dog has been stopped, comprising a ratchet pawl carried by the slow dog and engaging rack teeth on the dog bar.

6. In a drilling machine of the class described, the combination of a tool carrier, power means for shifting said carrier at successive rapid and feeding rates in one direction, and at a rapid rate in the other direction, and cumulative stop means for determining the amount of rapid and feed movement to be imparted to the carrier for each cycle, and for increasing the length of duration of each succeeding cycle by an amount equal to the time of the feed movement of this preceding cycle, comprising a dog bar on the carrier, a rapid movement dog frictionally engaging said bar for determining the amount of rapid movement to be imparted to the carrier, a second dog on said bar for determining the amount of slow movement to be given said carrier, and for reversing the direction of movement thereof at the end of each feed movement, means for mechanically connecting the slow movement dog to the dog bar to cause same to move therewith after the rapid dog has been stopped, means operable by the slow dog for effecting the reverse movement of the carrier.

7. In a drilling machine of the class described, the combination of a tool carrier, power means for shifting said carrier at successive rapid and feeding rates in one direction, and at a rapid rate in the other direction, and cumulative stop means for determining the amount of rapid and feed movement to be imparted to the carrier for each cycle, and for increasing the length of duration of each succeeding cycle by an amount equal to the time of the feed movement of this preceding cycle, comprising a dog bar on the carrier, a rapid movement dog frictionally engaging said bar for determining the amount of rapid movement to be imparted to the carrier, a second dog on said bar for determining the amount of slow movement to be given said carrier, and for reversing the direction of movement thereof at the end of each feed movement, means for mechanically connecting the slow movement dog to the dog bar to cause same to move therewith after the rapid dog has been stopped, means operable by the slow dog for effecting the reverse movement of the carrier, means operable after a predetermined number of cyclic movements have been imparted to the carrier for rendering the reversing means inoperative, and supplemental means operable for stopping the movement of the carrier.

8. In a drilling machine of the class described, the combination of a tool carrier, power means for shifting said carrier at successive rapid and feeding rates in one direction, and at a rapid rate in the other direction, and cumulative stop means for determining the amount of rapid and feed movement to be imparted to the carrier for each cycle, and for increasing the length of duration of each succeeding cycle by an amount equal to the time of the feed movement of this preceding cycle, comprising a dog bar on the carrier, a rapid movement dog frictionally engaging said bar for determining the amount of rapid movement to be imparted to the carrier, a second dog on said bar for determining the amount of slow movement to be given said carrier, and for reversing the direction of movement thereof at the end of each feed movement, means for mechanically connecting the slow movement dog to the dog bar to cause same to move therewith after the rapid dog has been stopped, means operable by the slow dog for effecting the reverse movement of the carrier, means operable after a predetermined number of cyclic movements have been imparted to the carrier by rendering the reversing means inoperative, supplemental means operable for stopping the movement of the carrier, and means for returning the rapid and slow dogs to their normal positions, on the dog bar and relative to the carrier, prior to the stopping of the carrier.

9. In a drilling machine of the class described, the combination of a tool carrier, power means for shifting said carrier at successive rapid and feeding rates in one direction, and at a rapid rate in the other direction, and cumulative stop means for determining the amount of rapid and feed movement to be imparted to the carrier for each cycle, and for increasing the length of duration of each succeeding cycle by an amount equal to the time of the feed movement of this preceding cycle, comprising a dog bar on the carrier, a rapid movement dog frictionally engaging said bar for determining the amount of rapid movement to be imparted to the carrier, a second dog on said bar for determining the amount of slow movement to be given said carrier, and for reversing the direction of movement thereof at the end of each feed movement, means for mechanically connecting the slow movement dog to the dog bar to cause same to move therewith after the rapid dog has been stopped, means operable by the slow dog for effecting the reverse movement of the carrier, means operable after a predetermined number of cyclic movements have been imparted to the carrier by rendering the reversing means inoperative, supplemental means operable for stopping the movement of the carrier, means for returning the rapid and slow dogs to their normal positions, on the dog bar and relative to the carrier, prior to the stopping of the carrier, and manually operated means for initiating a cycle of movement of the carrier.

10. In a drilling machine of the class described, the combination of a tool carrier, a hydraulic mechanism including a piston for actuating the carrier through a predetermined number of cyclic movements, each cycle of movement of the carrier being at a rapid and a slow rate in one direction followed by a rapid rate in the opposite direction, control means for said hydraulic means including a valve member having a plurality of operable positions, manual means for shifting said valve to a position for initiating a cycle of movement of the carrier, a slip dog means operable for changing the rate of movement of the carrier, and cumulative stop means for reversing the direction of movement of the carrier including a positive mechanical couple between the same and the carrier whereby succeeding cycles of movement of the carrier is progressively increased.

11. In a machine tool organization of the class described, the combination of a tool carrier, a piston connected with said carrier to effect its movement, a hydraulic circuit for actuating the piston, including a main valve having a plurality of operative positions, manual means for shifting the valve to its initial starting position to effect a rapid movement of the piston and carrier, a first power means for shifting the valve to change the rate of movement of the piston and carrier from a rapid to a slow rate, a second power means for reversely shifting the valve to its initial position to reverse the direction of movement of the piston and carrier, independent valve mechanism for each of said two last mentioned power means, and dog means carried by said carrier for actuating the valve mechanisms for said power means.

12. In a machine tool organization of the class described, the combination of a tool carrier, a piston connected with said carrier to effect its movement, a hydraulic circuit for actuating the piston, including a main valve having a plurality of operative positions, manual means for shifting the valve to its initial starting position to effect a rapid movement of the piston and carrier, a first power means for shifting the valve to change the rate of movement of the piston and carrier from a rapid to a slow rate, a second power means for reversely shifting the valve to its initial position to reverse the direction of movement of the piston and carrier, independent valve mechanism for each of said two last mentioned power means, and dog means carried by said carrier for actuating the valve mechanisms for said power means, and additional stop means on said carrier for shifting said main valve to a stop position for stopping the movement of the piston and carrier.

13. In a machine tool organization of the class described, the combination of a tool carrier, a piston connected with said carrier to effect its movement, a hydraulic circuit for actuating the piston, including a main valve having a plurality of operative positions, manual means for shifting the valve to its initial starting position to effect a rapid movement of the piston and carrier, a first power means for shifting the valve to change the rate of movement of the piston and carrier from a rapid to a slow rate, a second power means for reversely shifting the valve to its initial position to reverse the direction of movement of the piston and carrier, independent valve mechanism for each of said two last mentioned power means, and dog means carried by said carrier for actuating the valve mechanisms for said power means, and additional stop means on said carrier for shifting said main valve to a stop position for stopping the movement of the piston and carrier, the dog means for one of said power shifting means valves being cumulative, whereby its point of operation progressively advances.

14. In a machine tool organization of the class described, the combination of a tool carrier, a piston connected with said carrier to effect its movement, a hydraulic circuit for actuating the piston, including a main valve having a plurality of operative positions, manual means for shifting the valve to its initial starting position to effect a rapid movement of the piston and carrier, a first power means for shifting the valve to change the rate of movement of the piston and carrier from a rapid to a slow rate, a second power means for reversely shifting the valve to its initial position to reverse the direction of movement of the piston and carrier, independent valve mechanism for each of said two last mentioned power means, dog means carried by said carrier for actuating the valve mechanisms for said power means, additional stop means on said carrier for shifting said main valve to a stop position for stopping the movement of the piston and carrier, the dog means for one of said power shifting means valves being cumulative, whereby its point of operation progressively advances, and means in said circuit for varying the flow therein to vary the slow rate of movement of the carrier.

15. In a step drilling machine of the class described, the combination of a tool carrier, a piston operatively connected with said carrier, a hydraulic circuit for actuating the piston and the carrier including a four position valve, a manually operated lever connected with the valve for shifting same to a starting position for actuating the piston and carrier at a rapid rate in a given direction, dog means on the carrier for shifting the valve to a second position for changing the rate of movement of the piston and the carrier to a slow rate in the given direction, a first dog controlled power means for shifting the valve to a reverse position for changing the direction and rate of movement of the piston and carrier, a second dog controlled power means for shifting the valve to its initial position for again actuating the piston and carrier at a rapid rate in a given direction, said first mentioned dog means being cumulative and being advanced during each cycle of movement of the carrier an amount equal to the slow movement imparted thereto, stop means operable after a predetermined number of cyclic movements for rendering the second dog controlled power valve shifting means inoperative, means associated with said carrier shifting the valve to a stop position for stopping the movement of the piston and carrier after the second dog controlled power means has been rendered inoperative, and means for resetting the cumulative stop means after each cycle of movement of the carrier.

16. In a step drilling machine of the class described, the combination of a tool carrier, hydraulic means for actuating the carrier through repeated cycles in advancing and retracting directions, each cycle including a rapid movement, followed by a slow movement in a feeding direction, and a rapid movement in a retracting direction, a multi-position control valve in the hydraulic circuit, a valve shifting lever connected with the control valve, manual means connected with the lever for shifting the control valve to a starting position and initiating the rapid movement of the carrier in a feeding direction, dog means on the carrier for actuating the lever for shifting the control valve to change the rate of movement of the carrier, a hydraulically actuated piston acting on the lever for shifting the same and the valve to reverse the direction of movement of the carrier, a valve for connecting the piston with the hydraulic circuit, dog means on the carrier for actuating the piston control valve, and additional means for shifting the control valve to its initial position for again effecting a rapid movement of the carrier in a feeding direction.

17. In a step drilling machine of the class described, the combination of a tool carrier, hydraulic means for actuating the carrier through repeated cycles in advancing and retracting directions, each cycle including a rapid movement, followed by a slow movement in a feeding direction, and a rapid movement in a retracting direction, a multi-position control valve in the hydraulic circuit, a valve shifting lever connected with the control valve, manual means connected with the lever for shifting the control valve to a starting position and initiating the rapid movement of the carrier in a feeding direction, dog means on the carrier for actuating the lever for shifting the control valve to change the rate of movement of the carrier, a hydraulically actuated piston acting on the lever for shifting the same and the valve to reverse the direction of movement of the carrier, a valve for connecting the piston with the hydraulic circuit, dog means on the carrier for actuating the piston control valve, and additional means for shifting the control valve to its initial position for again effecting a rapid movement of the carrier in a feeding direction, the first mentioned dog means being cumulative and advancing the carrier at a rapid rate in a feeding direction to the point of previous reversal.

18. In a step drilling machine of the class described, the combination of a tool carrier, a piston and cylinder mechanism connected with the carrier for effecting a cyclic movement thereof, and hydraulic means for actuating the piston and cylinder mechanism, including a multi-position valve, manually operable means for shifting the valve to initiate movement of the carrier at a rapid rate in a feeding direction, a cumulative dog for shifting the valve to change the rate of movement of the carrier to a slow feed rate in said feeding direction, a dog for shifting the valve at the end of the slow feeding movement for reversing the direction of movement of the carrier, a rod for supporting said cumulative stop and feed stop dogs, yielding means for separating said dogs from one another on said rod, means for limiting the separation of said dogs and maintaining them in spaced relation to determine the duration of slow feed movement, means for locking the slow feed dog to the rod during the slow feed movement, and means for releasing the slow feed dog from the dog rod.

GEORGE K. McKEE.
CHARLES E. BERNITT.